April 9, 1963 R. D. HALL ET AL 3,084,484
PNEUMATIC ABRASIVE CUTTING APPARATUS
Filed April 2, 1962 4 Sheets-Sheet 1

INVENTORS
ROBERT W. JOHNSTON
ROBERT D. HALL
BY
ATTORNEY

April 9, 1963 R. D. HALL ET AL 3,084,484
PNEUMATIC ABRASIVE CUTTING APPARATUS
Filed April 2, 1962 4 Sheets-Sheet 2

INVENTORS
ROBERT W. JOHNSTON
ROBERT D. HALL
BY
ATTORNEY

April 9, 1963 R. D. HALL ET AL 3,084,484
PNEUMATIC ABRASIVE CUTTING APPARATUS
Filed April 2, 1962 4 Sheets-Sheet 3

INVENTORS
ROBERT D. HALL
ROBERT W. JOHNSTON
BY
ATTORNEY

April 9, 1963 R. D. HALL ET AL 3,084,484
PNEUMATIC ABRASIVE CUTTING APPARATUS
Filed April 2, 1962 4 Sheets-Sheet 4

INVENTORS
ROBERT D. HALL
ROBERT W. JOHNSTON
BY *John F. Lawler*
ATTORNEY

United States Patent Office 3,084,484
Patented Apr. 9, 1963

3,084,484
PNEUMATIC ABRASIVE CUTTING APPARATUS
Robert D. Hall, Los Altos, and Robert W. Johnston, San Jose, Calif., assignors to Sylvania Electric Products Inc., a corporation of Delaware
Filed Apr. 2, 1962, Ser. No. 184,475
10 Claims. (Cl. 51—8)

This application is a continuation-in-part of S.N. 69,846, filed November 17, 1960, entitled "Pneumatic Abrasive Cutting Tool," now Patent No. 3,053,016, granted September 11, 1962.

This invention relates to abrasive cutting apparatus, and more particularly to a pneumatic abrasive cutter in which a mixture of abrasive particles and air (or other gas) under pressure is expelled at high speed from a nozzle.

The very nature of fine abrasive powders used in cutters of this type causes problems of wear in moving parts of the cutting apparatus itself. For example, valves, venturi tubes, etc., associated with the abrasive feeding mechanism, being in or adjacent to the path of flow of the particles, are especially susceptible to wear. Some prior art devices use a combined gravity and shaker feed technique to inject the abrasive into the jet stream, but electrical meters and contacts, the many moving parts, noise, and attendant vibration involved in such apparatus are unavoidable and undesirable.

A general object of our invention is the provision of abrasive cutting apparatus with relatively few moving parts, none of which are exposed to the abrasive particles used in the system.

Another practice followed by the prior art is continuous feeding of abrasive particles by aspiration into the jet air stream. The disadvantage here is that there is a minimum diameter of nozzle opening which must be maintained in order that there shall be sufficient velocity in the feed line to draw abrasive particles into the jet stream. Since the size of nozzle opening dictates the minimum width of cut possible with the tool, this system of feeding imposes a limitation on the performance of the tool in this respect.

Another object of our invention is the provision of a system for feeding abrasive particles into the jet stream of an abrasive cutter in such a manner that the diameter of the cutter nozzle opening may be reduced substantially below that required for continuous feeding of abrasive particles into the jet stream.

The starting and stopping of continuous feed cutters has been accomplished in the past with two valves, one in the main air line on the pump side of the abrasive feed point, and the other in the abrasive feed line. Both valves are closed to stop operation, and the feed valve should be closed first to prevent spillage into and clogging of the line.

Another object of this invention is the provision of a single on-off control at the nozzle for starting and stopping operation of the whole system.

A still further object of the invention is the provision of a control system, which not only controls the air-abrasive stream at the nozzle of an abrasive cutter, but which also controls the flow of abrasive particles into the main feed conduit.

Other objects of our invention are the provision of an abrasive cutter with a minimum number of moving parts; the provision of a cutter of this type in which the feeding mechanism is powered solely by pneumatic pressure of the system itself; and the provision of a low-cost, light-weight, compact pneumatic cutter which requires very little maintenance.

These and other objects of our invention will become apparent from the following description of a preferred embodiment thereof, a reference being had to the accompanying drawings in which.

Figure 4:
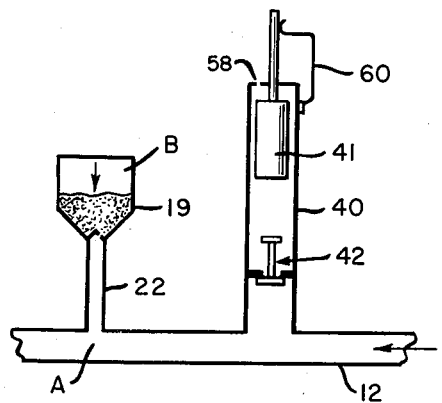
Figure 6:
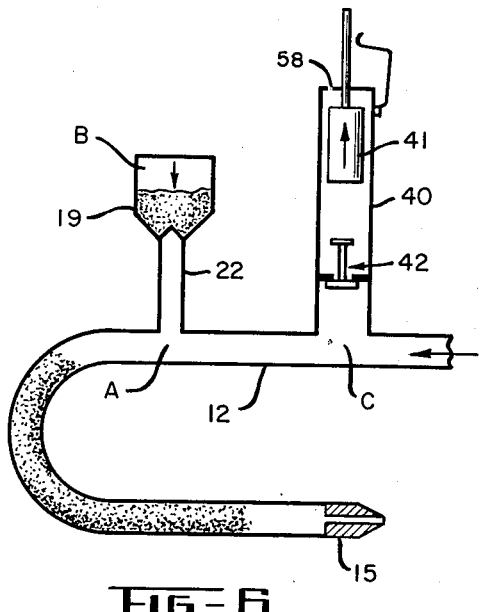
Figure 5:
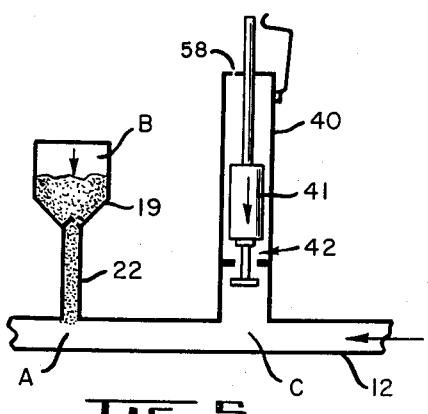
Figure 7:
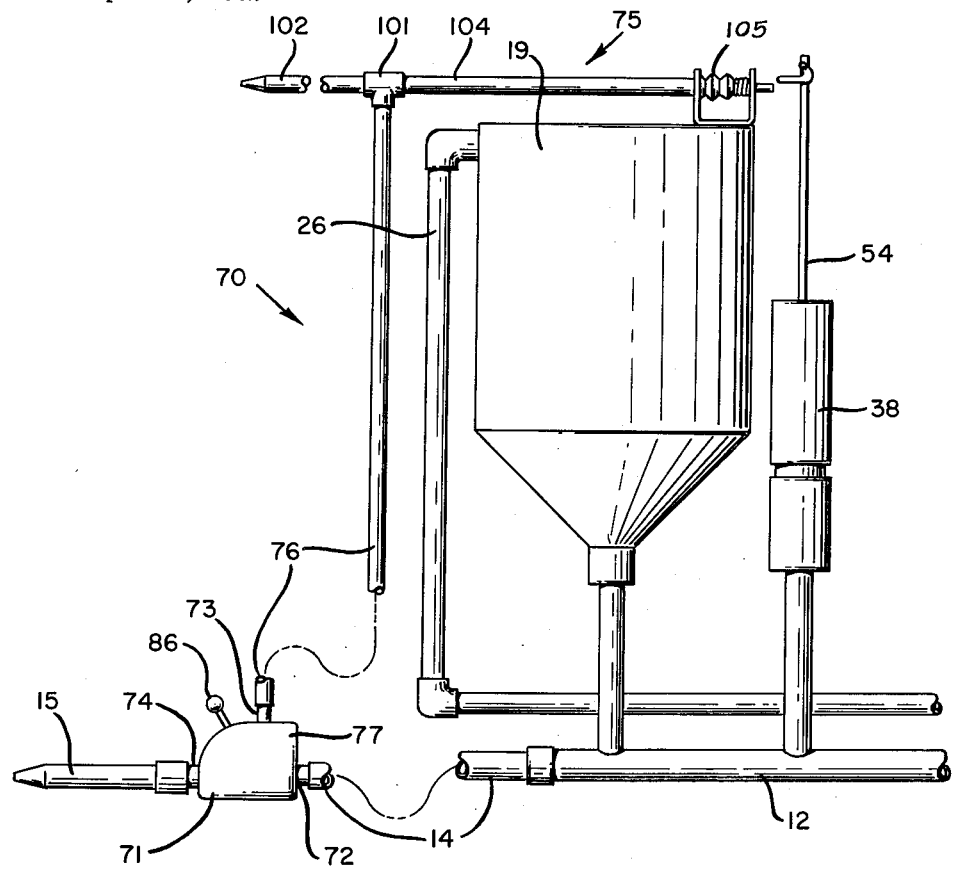
Figure 8:
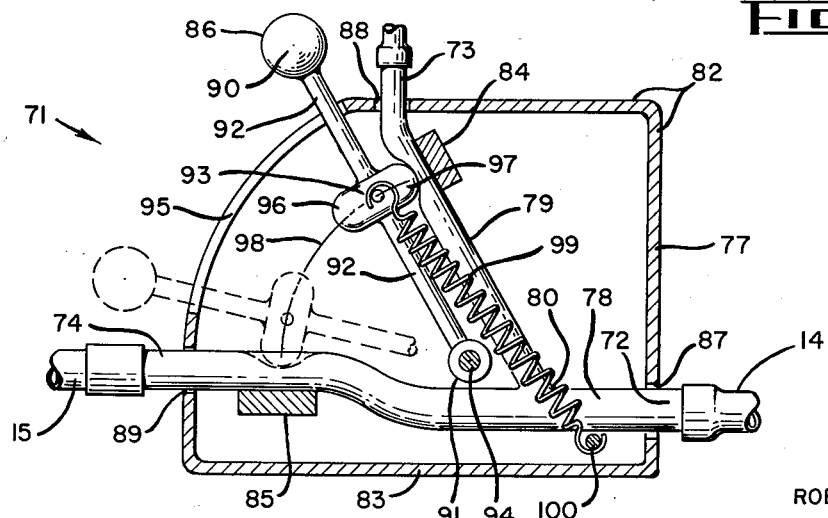
Figure 9:
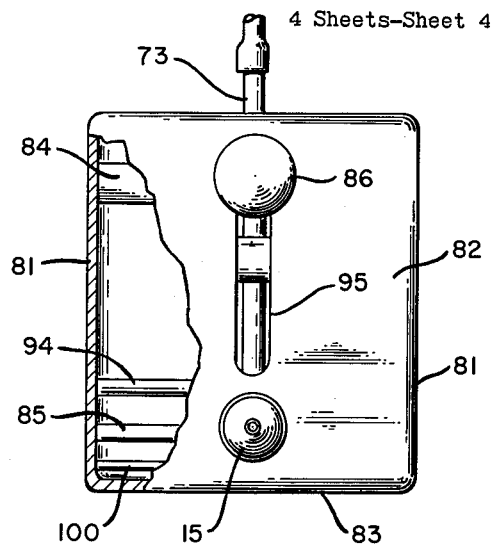
Figure 10:
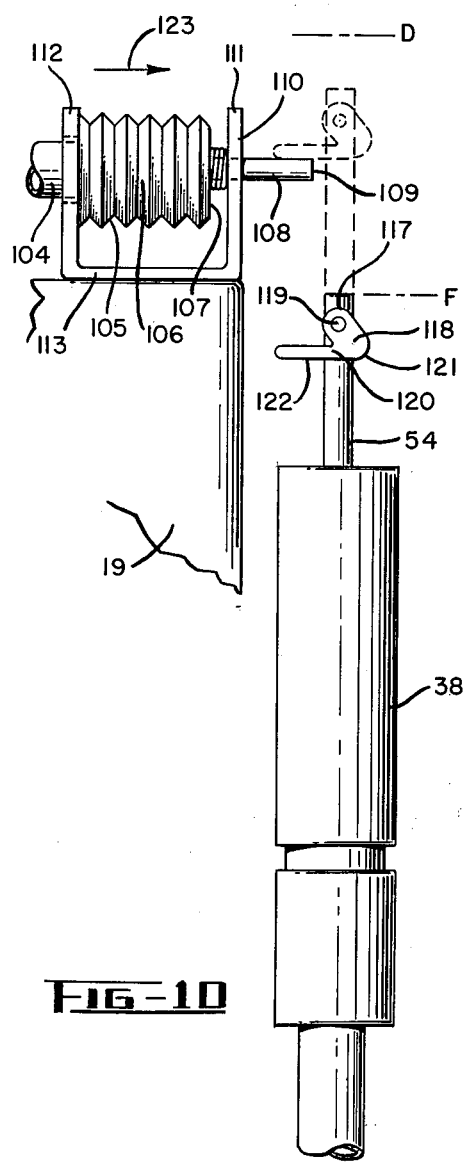
Figure 11:
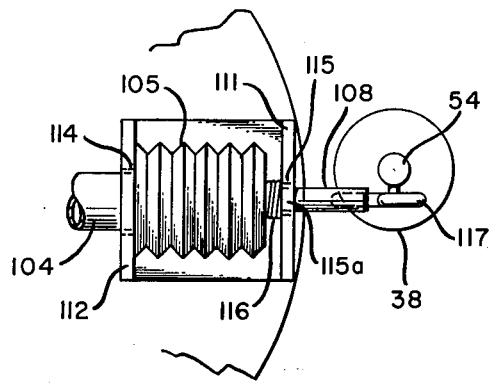

FIGURES 4–6, inclusive, are schematic diagrams showing the operation of the abrasive feeding mechanism;

FIGURE 7 is a partial assembly drawing of an abrasive cutting apparatus having control system which provides instantaneous "on-off" control of the abrasive stream;

FIGURE 8 is an enlarged view of the cut-off valve of the control system, the housing and support members of the valve being shown in section;

FIGURE 9 is a front elevation view of the nozzle valve;

FIGURE 10 is an enlarged view of the latch assembly of the control system whereby abrasive particles are prevented from entering the main feed conduit; and FIGURE 11 is a plan view of the latch assembly of FIGURE 10.

Briefly, our invention is based on a pressure differential feeding system wherein a pressure differential is applied momentarily and cyclically across the tank containing the abrasive particles to positively inject the particles into the jet stream. This pulse-type feeding system results in periodic injection of a predetermined quantity or charge of particles into the air stream. The length of the hose between the injection point and the nozzle, together with the back pressure effect of the small nozzle opening, effectively averages out these pulses so that the air-abrasive particle mixture flows from the nozzle in a practically uniform continuous stream. The pulse of differential pressure in the line is derived from a pneumatically operated pressure release valving mechanism located between the abrasive injection point and the source of line pressure. Momentary reductions of pressure on the underside of the abrasive tank caused by the valving mechanism produces the pressure differential pulses which push charges of abrasive particles into the jet stream, which is thereafter directed by a nozzle onto a working piece.

A control system for the apparatus has also been provided which gives "on-off" control of the abrasive stream at the nozzle and simultaneously starts and stops the feeding of the abrasive particles into the main feed line, and comprises a three-port cut-off valve attached to the outlet nozzle by a normally opened first output port, and to an abrasive-control system by a normally closed second output port. A toggle bar pivotably located between the pair of output ports acts as a sequential control switch for the stream. When the operator desires to stop the stream at the nozzle, the toggle bar is pivoted to engage and close the first port, which simultaneously opens the second output port and connects a pressure responsive abrasive-feed control system with the high pressure line. Air and abrasive enter the open port and instantaneously moves a control valve into engagement with the valving mechanism, thereby preventing further injection of the abrasive particles into the main feed line during the "off" period of the apparatus. When the operator again starts the flow of air and abrasive by opening the first output port, the pressure at the second output port is quickly lowered causing disengagement of the control valve from contact with the valving mechanism and the abrasive feeding action is resumed.

Figure 1:
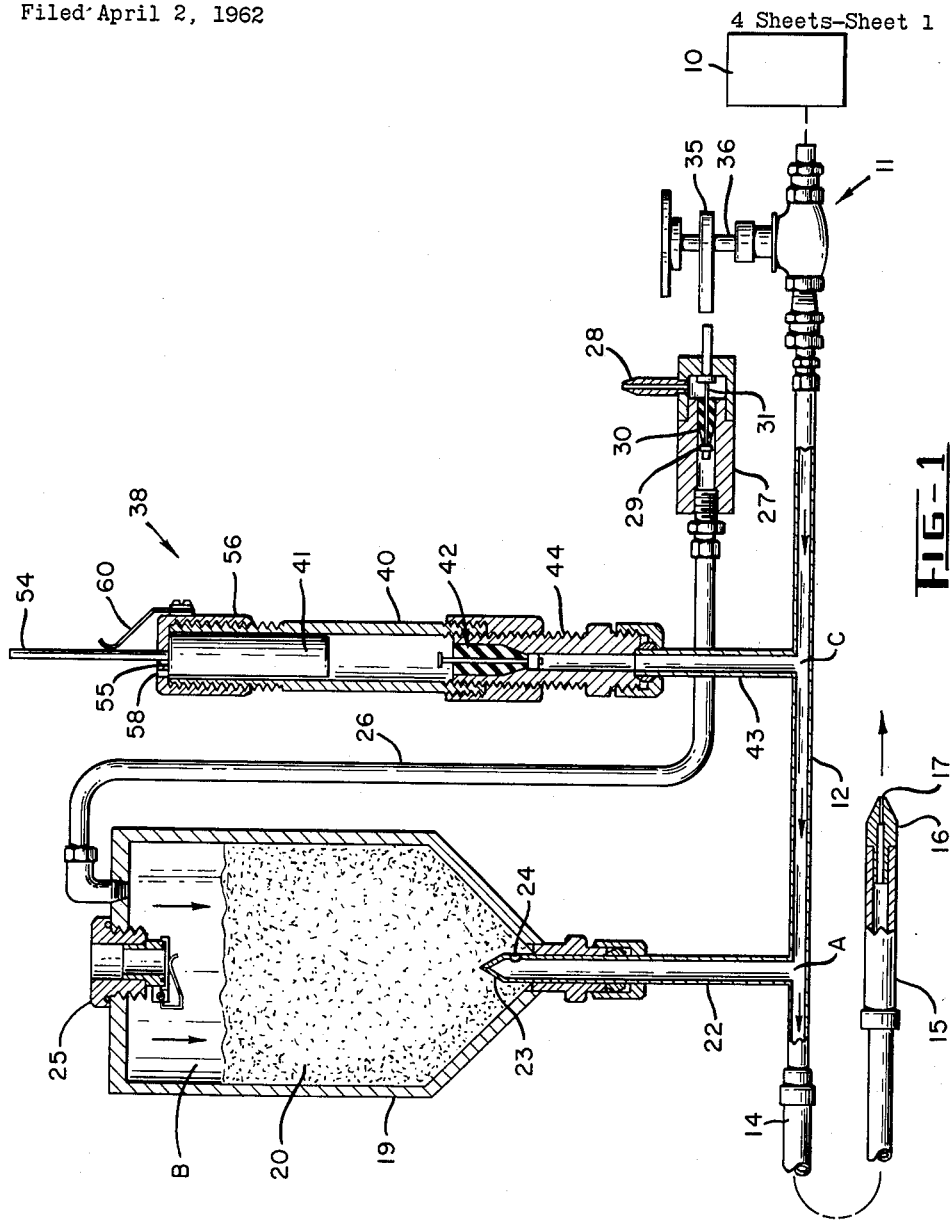
FIGURE 1 is an assembly drawing of an abrasive cutting apparatus embodying our invention, the principal parts of the apparatus being shown in section.

Referring now to the drawings, FIGURE 1 shows a system comprising a source of pneumatic pressure 10 connected by on-off valve 11 to a conduit 12, which may be pipe or metallic tubing. A flexible conduit or hose 14 secured to conduit 12 makes connection at the opposite end to a nozzle 15 which has a wear-resistant head 16 formed with an opening 17 through which abrasive-charged air is ejected in the direction of the arrow at high velocity to provide the cutting action.

A tank 19 containing abrasive material 20, such as aluminum oxide powder, is mounted above conduit 12 and is connected thereto by a feeder conduit 22 which opens directly into conduit 12 at point A, and which has an extension 23 projecting into the bottom of the tank. In order to prevent uncontrolled flow of abrasive material into the feeder conduit 22, the upper end of extension 23 is closed and the extension side wall has a feed opening 24 therein. Abrasive particles pass from the tank through hole 24 into conduit 22, and join the jet stream, indicated by the arrows, in conduit 12 at point A.

A removable cap 25 in the top of tank 19 provides access to tank for replenishing the supply of abrasive powder 20. In accordance with our invention, the space in tank 19 above the abrasive material is pressurized while the apparatus is operating. In order to relieve this pressure when the apparatus is turned off, the top of the tank is connected by line 26 to a pressure relief valve 27 having an exhaust outlet 28. Valve 27 is normally closed by the pressure in line 26 acting against valve head 29, which presses against seat 30. Valve 27 is opened when valve stem 31, and thus head 29, is displaced to the left, as viewed, by cam arm 35 on control handle 36 of main valve 11. This occurs when handle 36 is rotated to close valve 11, and the pressure in the upper part of the tank is thus relieved when pressure in the main line is turned off. When on-off valve 11 is opened, air under pressure from source 10 enters the tank via conduit 12, feeder conduit 22 and feed hole 24; and arm 35 allows relief valve 27 to close and thus permit full pressurization of the tank.

In order to positively feed abrasive material into the jet stream, a pneumatically-operated valving mechanism 38 is connected to conduit 12. Mechanism 38 comprises a cylinder 40, a plunger 41 movable in the cylinder, and a valve 42 in the base of the cylinder and actuated by plunger 41. Air from conduit 12 passes to cylinder 40 through conduit 43 connected to conduit 12 at a point C between pressure source 10 and injection point A. Conduit 43 is fastened to cylinder 40 by fitting 44, the upper end of which is fitted with an elongated valve 42.

Figure 2:
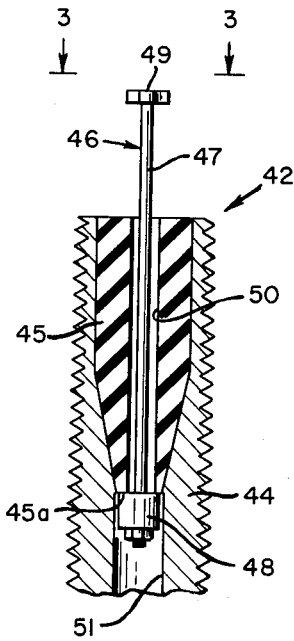
FIGURE 2 is a greatly enlarged sectional view of the valve part of the valving mechanism of our invention.
Figure 3:
FIGURE 3 is a plan view of the top of the valve stem as viewed on line 3—3 of FIGURE 2.

Valve 42 comprises an elongated tubular rubber-like insert 45, see FIGURE 2, the lower end 45a of which forms a valve seat, and a vertically movable member 46 consisting of a stem 47 extending through the insert and carrying a head 48 adapted to press against seat 45a to close the valve. The upper end of stem 47 has a scallop-shaped flange 49, see FIGURE 3, which limits the downward travel of the movable member. The bore 50 of insert 45 has a diameter larger than that of stem 47 and valve head 48 has a cross sectional dimension smaller than the inner diameter of adjacent parts of fitting 44. Accordingly, when the valve head is displaced from the seat 45a, downward as viewed, air escapes from main pressure line 12 through conduit 43 and insert 45 into cylinder 40. The scalloped shape of flange 49 insures that the top of insert bore 50 will be open to cylinder 40 when the flange engages the top of insert 45. This condition occurs only when valve 11 is in the off position and the conduits have become depressurized.

The movable member 46 of the valve 42 closes in response to pressure in line 12, and opens either when line pressure is turned off, or when member 47 is forceably depressed.

Plunger 41 has a diameter slightly less than the inside diameter of cylinder 40 in which it fits and has a guide stem 54 projecting upwardly from the plunger through a guide opening 55 in cylinder cap 56. A breather opening 58 in cap 56 provides an exhaust outlet for air in cylinder 40, and it is the function of the valving mechanism to control this exhausting operation as a means of controlling the feed of abrasive into the main line 12.

A spring clip 60 mounted on cap 56 presses against stem 54 to lock the plunger 41 in fixed position, and this clip is rotated out of contact with the plunger assembly when the valving mechanism is placed in operation. Since the diameter of plunger 41 is less than that of the cylinder bore, air under pressure admitted to the cylinder by valve 42 passes between the plunger and cylinder wall and escapes through opening 58.

The operation of the cutting apparatus and in particular the manner in which abrasive particles are fed into the jet stream will be better understood by reference to FIGURES 4, 5, and 6. When handle 36 of main valve 11 is rotated to the open position, the pressure builds up in conduit 12 and hose 14, and air is expelled through opening in nozzle 15. Simultaneously, arm 35 allows relief valve 27 to close and the tank becomes pressurized in the manner of an accumulator. At this point in the operating cycle, there is no feeding of the abrasive into conduits 22 or 12.

When the pressure in conduit 12 first builds up, valve head 48 moves up against seat 45a to close the valve, and stem 47 projects up into cylinder 40. The system is then ready for the start of the abrasive feeding operation as shown in FIGURE 4.

Spring 60 is now moved out of locking engagement with plunger stem 54, and plunger 41 falls by gravity to the bottom of cylinder 40 where it strikes flange 49 on valve stem 47, unseating valve head 48 and opening the valve, see FIGURE 5. As air rushes up through valve insert 45, around plunger 41 and out cap opening 58, there is a momentary sudden drop in pressure in line 12, which exists as long as valve 42 is open. The uprush of air through valve insert 45 upon opening of the valve immediately begins to arrest downward movement of the plunger, and within a very short time interval the pressure against the bottom of the plunger forces the latter upward in the cylinder out of contact with stem 47 so that the valve closes, see FIGURE 6. Upon closing of the valve, the pressure in line 12 immediately rises to its original value and remains there until plunger 41 once again falls and opens the valve. A "negative pulse" of pressure is therefore generated in the system pressure line 12, and this produces a "pulse" of differential pressure between points A and B in the system.

As the force against the bottom of upwardly moving plunger 41 diminishes with the closing of the valve, the pull of gravity overcomes the inertia of the plunger and the latter again moves down to begin another cycle.

As soon as valve 42 opens, a differential pressure is applied to abrasive material in tank 19, since the pressure in the tank then exceeds the pressure in conduits 22 and 12. This causes particles of the abrasive to blow through feed opening 24 of extension 23, and into conduit 12. As long as this difference in pressure between points A and B exists, abrasive material is thus blown into the line, and this feeding action stops when the pressure difference is reduced substantially to zero. The net effect is that a charge of abrasive material measured by the duration of each "negative pulse" in the pressure line is introduced into the air stream in conduit 12 and is carried to the nozzle as shown in FIGURE 6.

The quantity of abrasive material injected into the stream may be controlled by varying the width of the "negative pulse" of pressure, which is accomplished by adjusting the cycling period of reciprocating plunger 41 as by changing the length of its stroke. This can be accomplished by changing the effective length of cylinder 40 or by varying the weight of the plunger itself. Also, the rate of feed of abrasive into the line may be controlled by adjusting the amount of the differential pressure as by varying the effective size of exhaust opening 58 in cylinder cap 56.

A modified form of the invention shown in FIGURES 7, 8, 9, 10, and 11 provides an "on-off" control system 70 (FIGURE 7) which operates on the main stream at the nozzle 15 and also starts and stops the abrasive feeding action. The system 70 comprises a three-port cut-off valve assembly 71 located in feed line 14 and connected to an abrasive control system 75 by control line 76. Extending beyond the surface of wedge-shaped housing 77 of cut-off valve 71 are ports 72, 73, and 74. Input port 72 is connected to main feed line 14, first output port 73 is connected to control line 76, and second output port 74 is connected to nozzle 15.

Valve assembly 71 comprises a flexible main conduit 78, see FIGURE 8, which permanently connects main hose 14 to nozzle 15 and whose opposite ends are ports 72 and 74, and a flexible control conduit 79 joined at one end 80 with main conduit 78 and whose opposite end consists of port 73. Housing 77 encloses and supports conduits 78 and 79 and comprises side walls 81 (FIGURE 9), broad walls 82 (through which ports 72, 73, 74 extend), and base wall 83. Conduits 78 and 79 are supported adjacent to the base wall 83 and the forward broad wall 82 by means of stops 84, 85 supported between side walls 81 and by coplanar openings 87, 88, 89 in forward and rearward broad walls 82. The stops are preferably rectangular in cross section and located in contact with the conduits 78, 79 as shown in FIGURE 8.

Extending outwardly on the nozzle side of the housing between conduits 78, 79, toggle handle 86 (hereinafter referenced "handle") permits manual control of the air-abrasive stream out of the nozzle and comprises hemispherical end portions 90, 91 connected to an enlarged central pinch cock 93 by cylindrical support members 92. Slideably attaching to end 91 to allow pivotable movement of the handle 86 relative to housing 77, i.e., along arc 98, is cylindrical support member 94 which has ends attached to the side walls 81 of the housing coplanar with stops 84 and 85 (FIGURE 9). End 90 extends beyond the plane of the surface of front broad wall 82 through elongated slot 95 which is coplanar with the openings 87, 88, 89 and connects by support member 92 to elongated pinch cock 93 located in the central portion of the handle. Pinch cock 93 comprises elongated forward and rearward portions 96, 97 which are formed with rounded end surfaces which make alternating engagement with conduits 78, 79, although under normal operating conditions pinch cock 93 is engaged with flexible conduit 79 as shown in solid line in FIGURE 8. Securing the pinch cock in engagement with conduits 78, 79 is toggle spring 99 located between the pinch cock 93 and support post 100, post 100 also being attached to side walls 81 as illustrated in FIGURE 9.

Referring to FIGURE 7, abrasive control system 75 connected by control line 76 to valve 71 comprises a T-shaped fitting 101 located in the line 76 having ends into which attach nozzle 102 which, in turn, connects to dust removal or abrasive reclaiming units (not shown), and metal conduit 104, conduit 104 being terminated by vacuum tight bellows 105. Bellows 105 has a flexible side wall 106 (FIGURE 10) which expands or contracts with changes of pressure and an end wall 107 which is attached to a cylindrical rod 108 whose end 109 is adjacent reciprocating stem 54 of valve mechanism 38 traveling between terminal points D and F. In order to support bellows 105 and rod 108, a support bracket 110 is located atop the tank and comprises parallel broad walls 111, 112 supporting bellows 105 and rod 108 therebetween and having ends connected to side wall 113. Broad wall 112 has a surface which rigidly connects to bellows 105 and is formed with an opening 114 (FIGURE 11) coaxial thereof through which air enters from conduit 104 when port 73 is connected with pressure source 10 to expand the side wall of the latter and cause axial travel of rod 108 in the direction of the stem 54. Supporting rod 108 during such travel is side wall 115 of guide opening 115a in broad wall 111 formed with a thin film of ceramic, plastic or the like attached thereon which slideably engages an end portion of the rod. Helical compression spring 116 coaxially located of rod 108 attaches between end wall 107 of the bellows 105 and broad wall 111 to return the bellows to its rest position after the port 73 is closed with respect to pressure source 10 as explained below.

Pivotably attached to the upper end of stem 54 is V-shaped dog latch 117, see FIGURE 10, having an enlarged first leg 118 and a reduced second leg 120 having its axis of symmetry parallel with that of rod 108. Leg 118 joins leg 120 at offset junction 121 and is pinned at the other end to stem 54 by post 119 a fixed distance from the end of the stem so that surface 122 of latch 117 is above rod 108 when stem 54 is at upper terminal point D. Thus, when the rod 108 is extended towards the stem, engagement of the rod and latch will occur below terminal point D on the downward stroke of the stem cycle thereby allowing the stem to be restarted by gravity when rod 108 is disengaged.

The operation of the control system will now be explained with reference to FIGURES 7, 8, and 10. At the start of operation, when the main valve 11 of the cutting apparatus is opened (FIGURE 1), the cut-off valve 71 has port 74 in the "open" position with respect to feed line 14 and has port 73 in the "closed" position, pinch cock 93 of toggle handle 86 making engagement with conduit 79 as shown in solid line in FIGURE 8. Pressure builds up in conduit 12 and in tank 19. Abrasive particles are then injected into the stream by the action of the valving mechanism 38 periodically reducing the pressure in the conduit 12 below the pressure in tank 19, and the mixture of air and abrasive is thereafter emitted from nozzle 15.

When the operator desires to stop the flow of the air-abrasive stream, he moves toggle handle 86 in a counter-clockwise direction as viewed in FIGURE 8, pinch cock 93 engaging and collapsing conduit 78 adjacent stop 85, thereby opening port 73, and closing port 74 with respect to feed line 14. Air and abrasive enter port 73 and travel through conduit line 76 to nozzle 102 where a restrictive orifice of the latter creates a rapid rise in pressure in conduit 104 and bellows 105. This pressure actuates the bellows 105 causing its side wall 106 (FIGURE 10) to expand in the direction of arrow 123 overcoming the compression forces of spring 116 and thereby placing rod 108 in a position to engage the latch 117 and interrupt reciprocation of stem 54.

Inasmuch as the engagement of the rod 108 with stem 54 occurs only when the stem is below top dead center in its downward reciprocating stroke, latch 117 is formed so that it is pivotable in the counter-clockwise direction as seen in FIGURE 10, to allow the latch to ride past the rod on the up-stroke of the plunger, a necessary precaution in case the rod is extended when the stem is below the plane of the axis of symmetry of rod 108. After the latch rides past the rod, on the subsequent down-stroke of the stem, surface 122 of the second leg 120 engages the upper surface of the rod. As the latch begins to rotate in a clockwise direction, the rod and latch become wedged because offset junction 121 of the latter is formed so that the distance from junction 121 to pivot post 119 is longer than that from the plane of end 109 to the same post. Thus, in addition to preventing further passage of the air-abrasive stream from the nozzle 15, control system 70 also stops injection of the abrasive particles from tank 19 into the main feed line 12 without spillage or build up of abrasive material within the system.

When the operator desires to again actuate the cutter, he moves the bar 86 clockwise as viewed in FIGURE 8, to open port 74 and close port 73. Line 76 and conduit 104 are quickly bled clear of air by means of the orifice of nozzle 102 and spring 116 retracts rod 108 from engagement with stem 54 which allows the abrasive feeding action to resume.

When the operator desires to close down the apparatus for long periods of time, however, the main valve 11 adjacent to pressure source 10 (FIGURE 1) is used instead of the control system 70 wherein valve 11 is closed by movement of the handle 36 which simultaneously causes cam arm 35 to open relief valve 27. This closes the system to pressure source 10, and also rapidly depressurizes the tank to atmosphere, thus preventing pressure otherwise captive in the tank from forcing an excessive amount of abrasive through hole 24 and clogging conduits 12 and 22.

Changes, modifications, and improvements to the above described preferred embodiment of our invention may occur to those skilled in the art without departing from the spirit of the invention. The appended claims define the scope of the invention.

We claim:

1. A control system for an apparatus for feeding a flowable substance into a pressurized gas stream comprising
    a conduit having a delivery end and a source end,
    a tank containing said substance connected at a first junction to said conduit intermediately of said ends whereby the pressure in the tank is substantially equal to the pressure of the gas at said junction,
    and a pressure control mechanism connected at a second junction to said conduit, said mechanism in a first operating state connecting said conduit to exhaust and thereby reducing pressure at said second junction which reduces pressure at said first junction below tank pressure and causes injection of said substance from the tank into the conduit and in a second operating state disconnecting said conduit from exhaust and thereby causing pressure of the tank to be substantially equal to the pressure of the gas at said first junction,
    cutoff valve means connected to said conduit at said delivery end having first and second output ports, said first port being normally open and said second port being normally closed relative to said source end of said conduit, and
    a pressure sensitive control valve connected to said normally closed second port and located adjacent to said pressure control mechanism having control means, said control means being engageable with said mechanism when said first port is closed and said second port is opened to fluid pressure of said source.

2. A control system for an apparatus which feeds a flowable substance into a gas stream comprising
    a conduit having a delivery end and a source end,
    a source of pressurized gas connected to said conduit at said source end,
    a tank containing said substance connected to said conduit intermediately of said ends whereby the pressure in the tank is substantially equal to the pressure of the gas at said junction,
    a valving mechanism connected to said conduit between said tank and said source comprising valving means for periodically opening and closing said conduit at the junction of the mechanism and the conduit to periodically reduce the pressure at said junction thereby causing a reduction in pressure at the junction of said tank and said conduit and injection of said substance into said conduit to form a mixture of air and said flowable substance,
    a cutoff valve connected to said conduit at said delivery end having a first output port normally open with respect to said source, a second output port normally closed to said source, and a first control means for opening and closing said ports in sequence,
    a nozzle connected to said first port for expelling said mixture, and
    a control valve connected to said second port and located adjacent to said valving mechanism comprising a second control means, said second control means engageable with said valving means of said valving mechanism when said first port is closed with respect to said source and said second port is connected therewith thereby preventing injection of said flowable substance into said conduit.

3. A control system for pneumatic abrasive cutting apparatus having a source of pressurized air and a nozzle for directing a stream of air-abrasive powder mixture against an object to be cut, comprising
    a main conduit connected to said source,
    a cutoff valve connecting said conduit to said nozzle and having a first output port normally open with respect to said source and connected to said nozzle, said valve also having a second output port normally closed to said source and a first control means for opening and closing said ports in sequence wherein said second port is open before said first port is closed,
    a tank containing the abrasive powder,
    a feed conduit connecting the interior of the tank to said main conduit at a first junction so that pressure in the tank is substantially equal to the pressure of the air in the main conduit at said junction,
    means for periodically reducing the pressure in said main conduit comprising a tubular member connected at one end to said conduit and having an exhaust opening therein, valve means in said member controlling the flow of air from the main conduit to said exhaust opening,
    a plunger in said member and reciprocable vertically therewithin, said plunger engaging and opening said valve means at one limit of plunger travel and thereby momentarily decreasing the pressure in the main conduit at said first junction,
    and a control valve connected to said second port and located adjacent to said pressure reducing means comprising a second control means, said second control means including an actuator rod engageable with said plunger when said control means is connected with said source thereby preventing injection of abrasive into said conduit.

4. A control system comprising
    a valving mechanism including an elongated vertically extending hollow cylinder having an exhaust opening at one end and being connected at the other end intermediately of a source of air pressure and an exhaust nozzle,
    a valve mounted in said other end of the cylinder controlling the flow of air from said source into said cylinder and having a movable member responsive to source pressure to move to a closed position and block said flow into said cylinder; and a plunger disposed in said cylinder and movable vertically therewithin between lower and upper limits, said plunger being loosely fitted in said cylinder whereby air flowing into said cylinder from said source simultaneously exerts an upward force on said plunger causing upward movement of said plunger relative to said cylinder, and thereafter escaping between the plunger and cylinder through said exhaust opening, said plunger thereafter falling in response to gravity and engaging said movable valve member at said lower limit of plunger travel for opening the valve and disengaging said movable member during upward movement in response to the force of uprushing air,
    and control means to interrupt vertical travel of said plunger at an intermediate location between the upper and lower travel limits in response to closing said exhaust nozzle relative to said source.

5. A control system for an abrasive cutting apparatus comprising a main conduit,
   a source of air pressure connected to one end of said conduit,
   a cutoff valve communicating with the other end of said conduit having flexible first and second conduits, said first conduit being connected at one end to said main conduit and having an opposite end comprising a first output port, said second conduit connected at one end to said first conduit and having an opposite end comprising a second output port, and a toggle handle pivotably attached between said first and second conduits normally engaged with said second conduit thereby closing said second port to said source of air pressure,
   a nozzle connected with said first port, said nozzle having a small opening through which air passes at high velocity,
   a tank containing an abrasive powder supported above and connected at a first junction with said main conduit,
   a valving mechanism comprising an elongated vertically extending hollow cylinder mounted above the main conduit, said cylinder having exhaust openings at the upper end and being connected at the lower end to said main conduit between the source of air pressure and said tank; a valve mounted in the lower end of said cylinder controlling the flow of air from said conduit into said cylinder and having a movable member responsive to pressure in the main conduit to move to a closed position and to block said flow,
   and a vertically reciprocating plunger disposed in said cylinder having an end adapted to engage and to open said valve member at one limit of plunger travel, and a latch means mounted to an opposite end of said plunger for interrupting plunger travel at an intermediate point between the limits of plunger travel,
   and a pressure sensitive control valve comprising an actuator rod located adjacent to said plunger and movable along a horizontal plane relative to said plunger travel, and a support conduit connecting said rod to said second port whereby when the toggle handle of said cutoff valve is disengaged from said second conduit and engaged with said first conduit, fluid pressure from said main conduit is communicated to said rod causing said rod to engage said latch of said plunger thereby preventing reciprocating movement of said plunger and injection of abrasive into said conduit.

6. A control system for an abrasive cutting apparatus comprising a main conduit,
   a source of air pressure connected to one end of said conduit,
   a cutoff valve communicating with the other end of said main conduit having a housing, flexible first and second conduits enclosed by said housing, said first conduit being connected at one end to said main conduit and having an opposite end comprising a first output port, said second conduit connected at one end to said first conduit and having an opposite end comprising a second output port, and a toggle handle pivotably attached to said housing between said first and second conduits and having a central pinch cock normally engaged with said second conduit thereby closing said second port to said source of air pressure,
   a nozzle connected with said first port, said nozzle having a small opening through which air passes at high velocity,
   a tank containing an abrasive powder supported above and connected at a first junction with said conduit between said cutoff valve and said source of air pressure,
   a valving mechanism comprising an elongated vertically extending hollow cylinder mounted above the main conduit, said cylinder having exhaust openings at the upper end and being connected at the lower end to said main conduit between the source of air pressure and said tank; a valve mounted in the lower end of said cylinder controlling the flow of air from said conduit into said cylinder and having a movable member responsive to pressure in the main conduit to move to a closed position and to block said flow; and a plunger having a reduced upper portion and an enlarged lower portion disposed in said cylinder and movable vertically therewithin, said upper portion having a pivotable V-shaped latch mounted thereon, said lower portion being loosely fitted in said cylinder whereby air flowing into said cylinder from said main conduit exerts upward force on said plunger causing upward movement of said plunger relative to said cylinder, air thereafter escaping between the plunger and cylinder through said exhaust openings, said plunger falling in response to gravity and being engageable with said movable valve member for opening the valve whereby a sudden momentary decrease in pressure occurs in the main conduit at said first junction and causes injection of abrasive into said conduit,
   and a pressure sensitive control valve comprising a support conduit having communication with said second port; a second outlet nozzle having a restricted orifice connected to one end of said support conduit, a bellows connected to the other end of said support conduit and an actuator rod connected to said bellows in a plane adjacent to said reciprocating plunger, said rod being movable in a horizontal plane and engageable with said latch of said plunger when fluid pressure from said main conduit is communicated to said bellows, thereby preventing reciprocating movement of said plunger and injection of abrasive into said conduit.

7. Apparatus for feeding a flowable substance into a gas stream comprising
   a conduit,
   a source of pressurized gas connected to said conduit,
   a tank containing said substance connected to said conduit whereby the pressure in the tank is substantially equal to the pressure in the conduit,
   a pressure control mechanism connected to said conduit for periodically reducing the pressure in said conduit whereby the difference between the pressure in said tank and the pressure in the conduit blows said substance from the tank into the conduit,
   feed control means adjacent to said mechanism and operative to disable same and stop the feeding of said substance into said stream, and means for selectively actuating said feed control means.

8. Apparatus for feeding a flowable substance into a gas stream comprising
   a main conduit,
   a source of pressurized gas connected to said conduit,
   a tank containing said substance,
   a feed conduit connected between said tank and said main conduit providing a feed path and permitting pressure in the tank to substantially equal pressure in the conduit,
   means for controlling the relative pressures in said tank and conduit whereby a difference between the pressure in said tank and the pressure in the conduit blows said substance from the tank into the conduit, and
   means for simultaneously disabling said pressure controlling means and stopping the flow of said gas stream.

9. Apparatus according to claim 8 with a nozzle connected to one end of said conduit, said last named means comprising a stream shut-off valve at said nozzle and a pressure responsive mechanism located at said pressure controlling means and operatively connected to said valve, said pressure responsive mechanism disabling said pressure controlling means when said valve stops said stream.

10. Mechanism for mixing a flowable substance with a pressurized gas comprising a conduit, a source of said pressurized gas connected to said conduit, a tank containing said substance connected to said conduit whereby the pressure in the tank is substantially equal to the pressure in the conduit, an exhaust outlet connected to said conduit, control means periodically opening and closing said outlet for changing the pressure in said conduit whereby the difference between the pressure in said tank and the pressure in the conduit blows said substance from the tank into the conduit, a valve connected to said conduit downstream from the connection of the tank to the conduit, means for operating said valve to open and close said conduit, and a pressure responsive member connected to said conduit between said valve and said tank connected to the conduit, said member being located adjacent to said control means and operative to interrupt the periodic opening and closing of the outlet when said valve closes said conduit.

References Cited in the file of this patent

UNITED STATES PATENTS

| | | |
|---|---|---|
| 2,388,818 | Bick | Nov. 13, 1945 |
| 2,395,420 | Myers | Feb. 26, 1946 |
| 2,753,664 | Garver | July 10, 1956 |
| 2,938,305 | Bipes | May 31, 1960 |